July 17, 1956     W. J. CARTWRIGHT     2,755,366
SINGLE LAP SPOT WELDER
Filed May 21, 1954     9 Sheets-Sheet 1
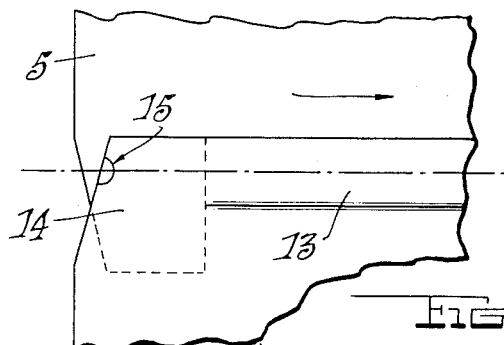
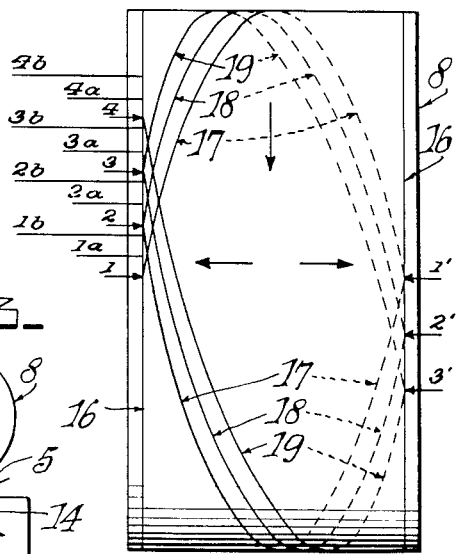
INVENTOR
William J. Cartwright
BY Mason, Porter, Diller & Stewart
ATTORNEYS

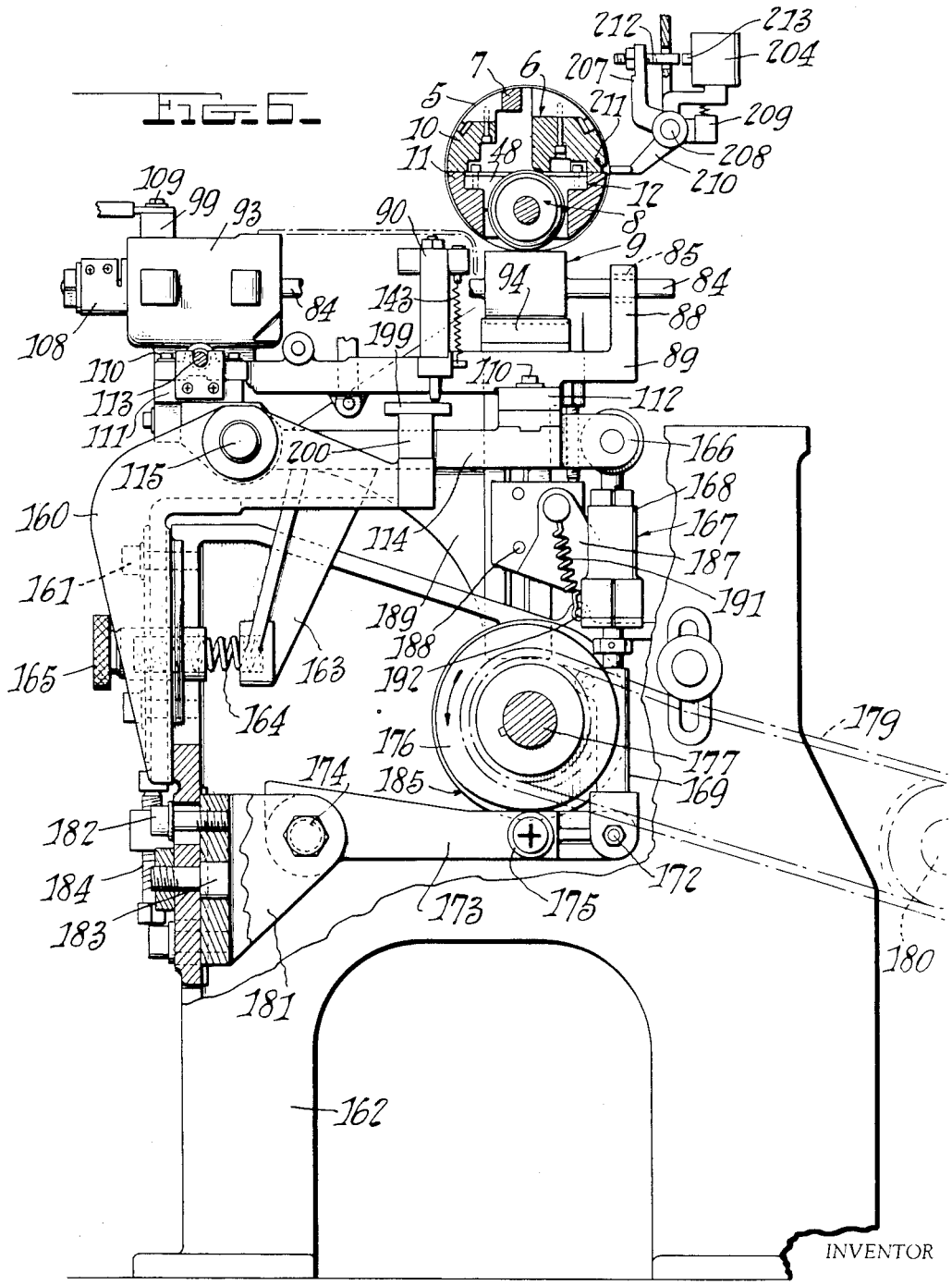

July 17, 1956   W. J. CARTWRIGHT   2,755,366
SINGLE LAP SPOT WELDER
Filed May 21, 1954   9 Sheets-Sheet 3
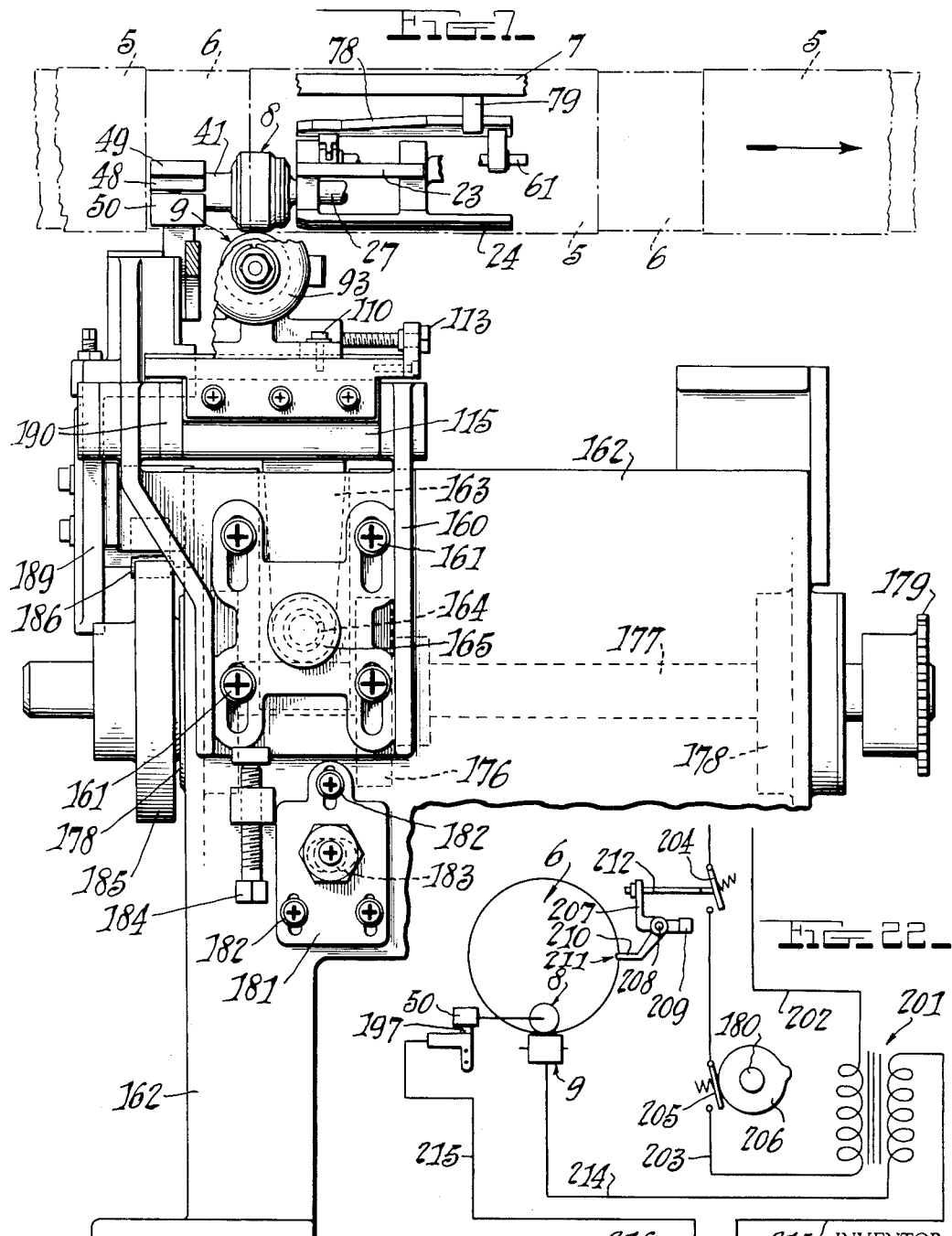
INVENTOR
William J. Cartwright
BY Mason, Porter, Diller & Stewart
ATTORNEYS

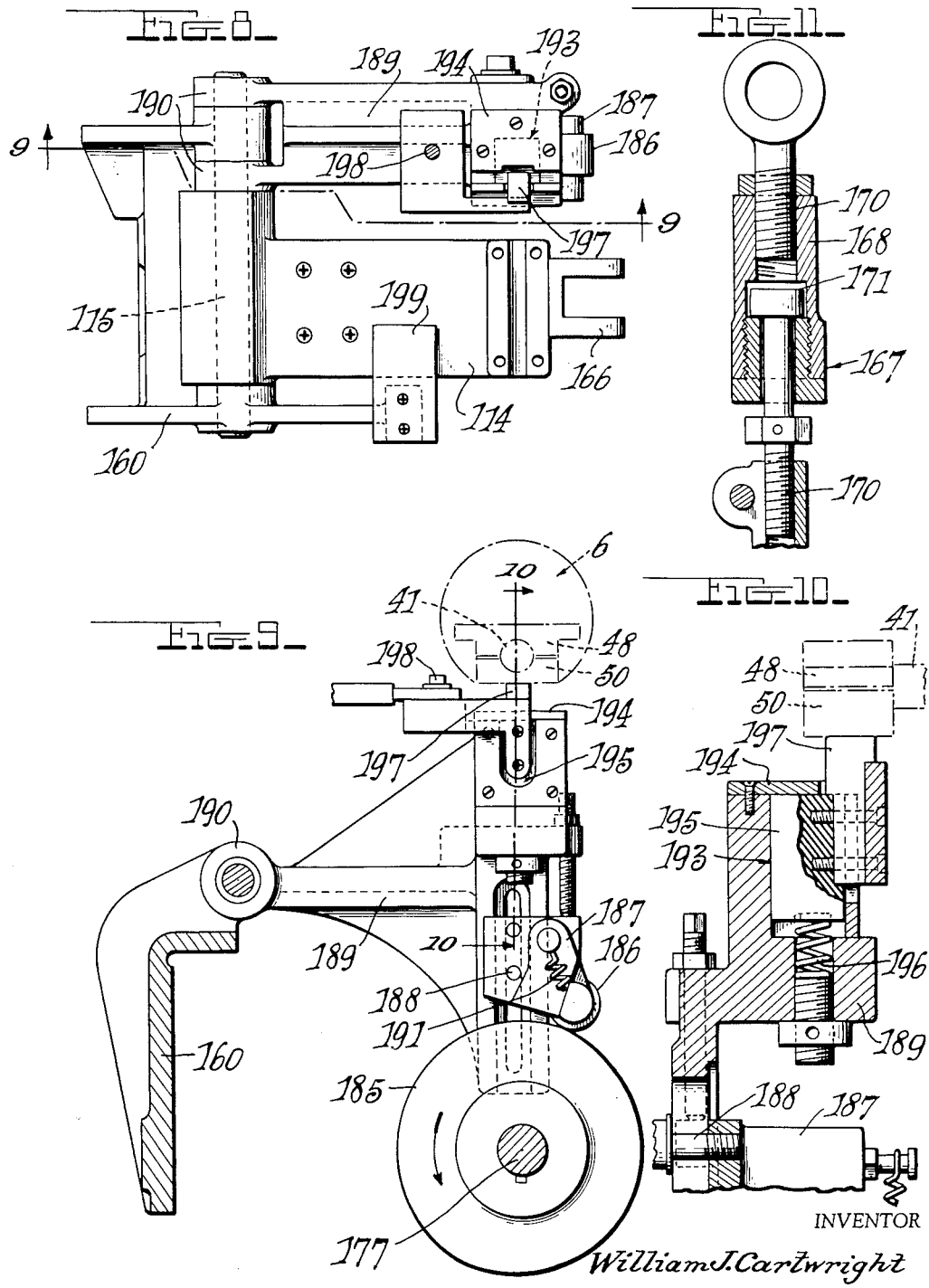

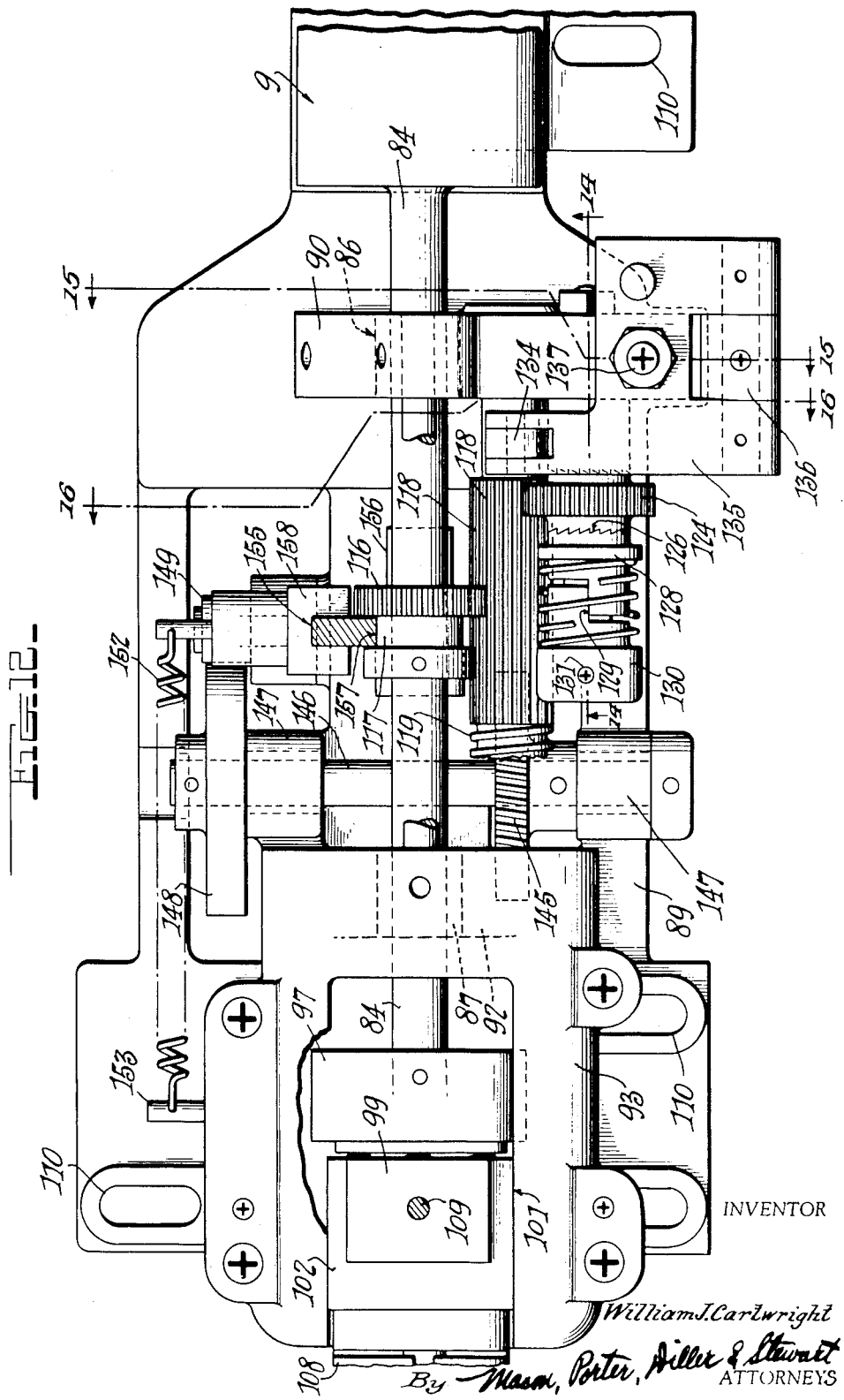

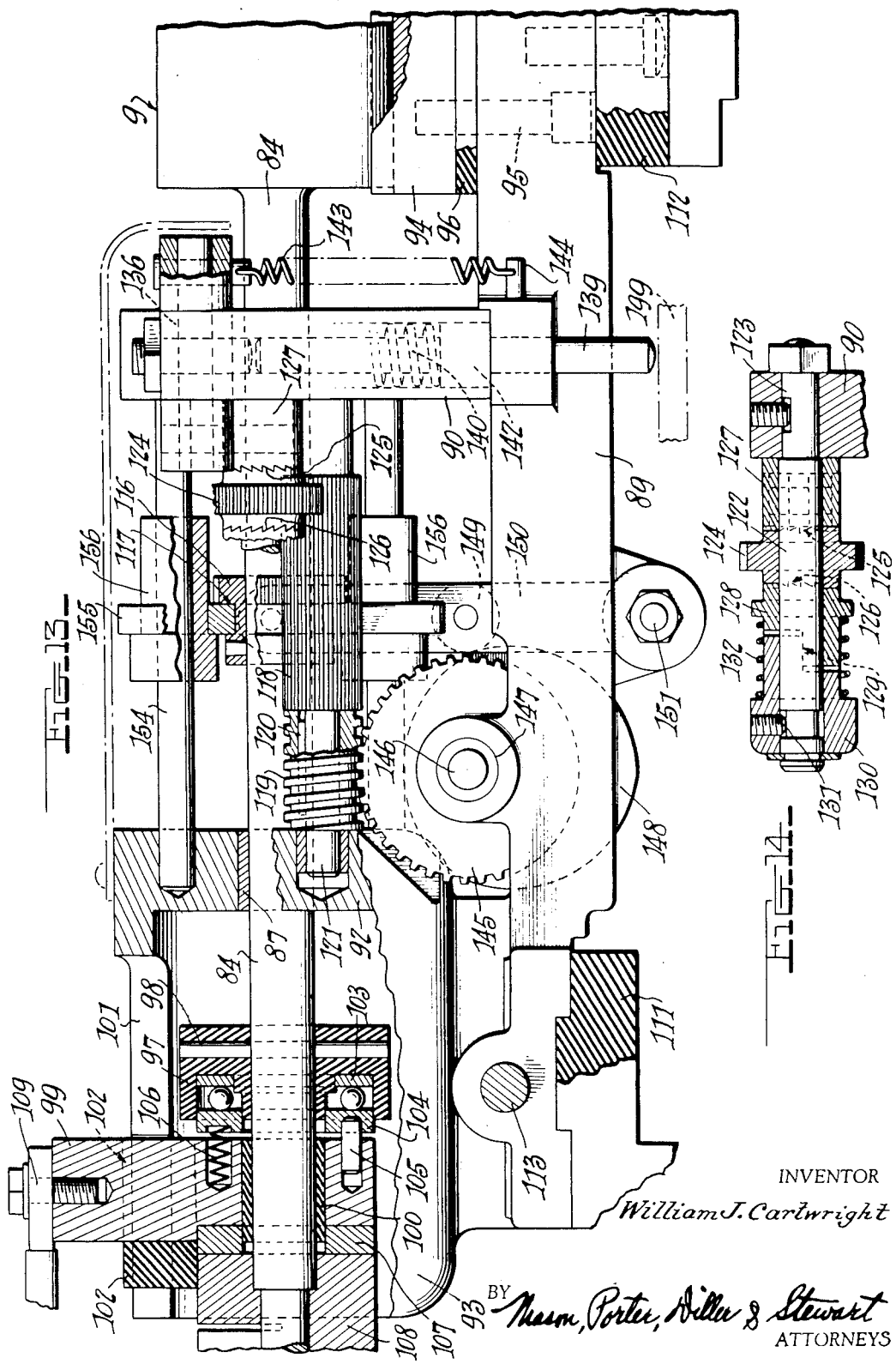

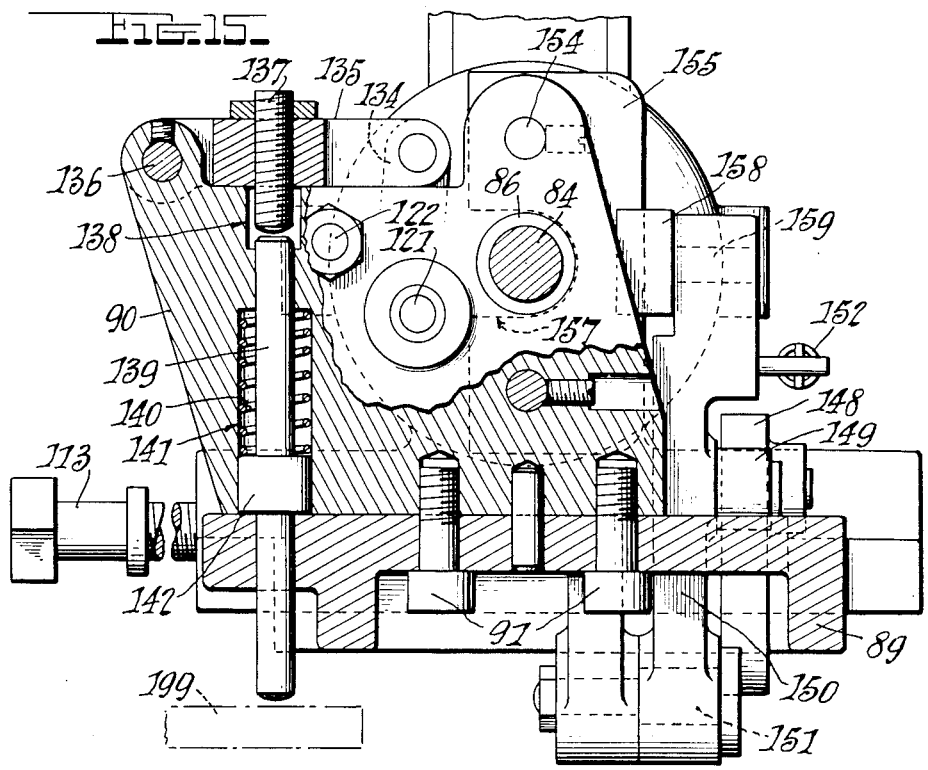
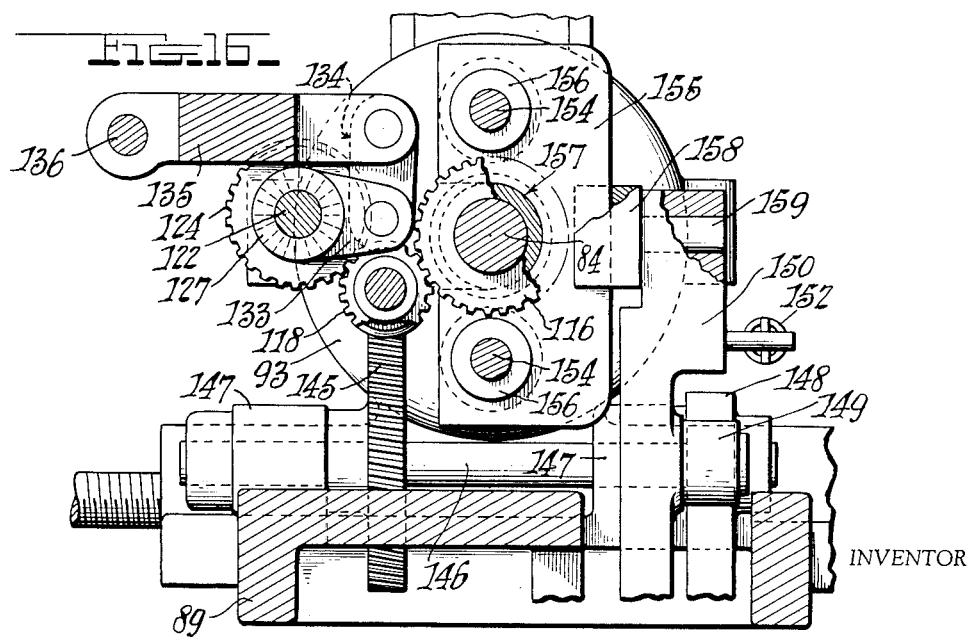

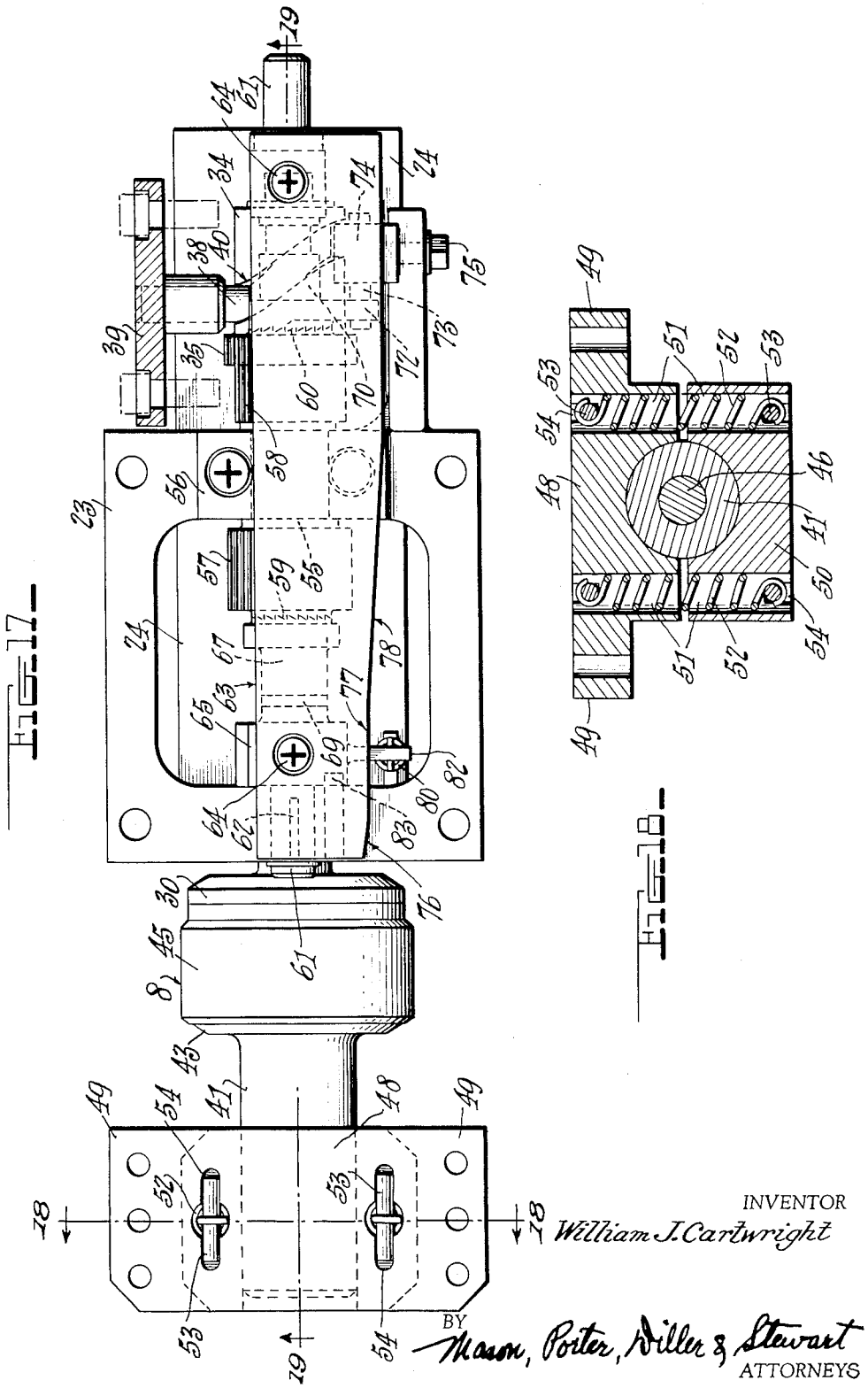

July 17, 1956 — W. J. CARTWRIGHT — 2,755,366
SINGLE LAP SPOT WELDER
Filed May 21, 1954 — 9 Sheets-Sheet 9
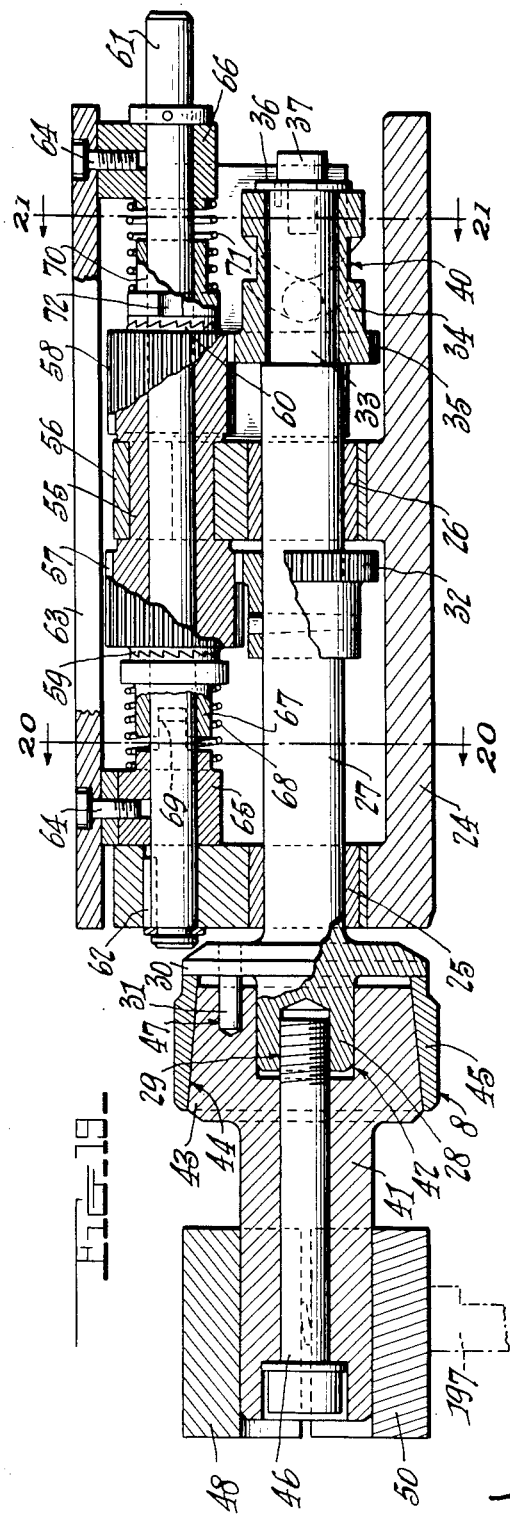
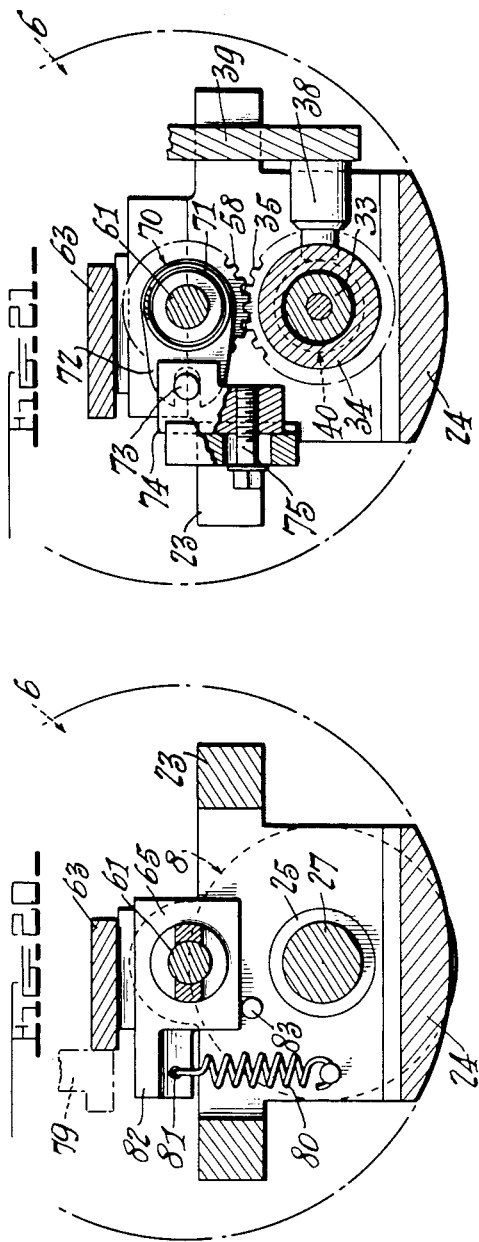
INVENTOR
William J. Cartwright
BY Mason, Porter, Diller & Stewart
ATTORNEYS

United States Patent Office 2,755,366
Patented July 17, 1956

2,755,366

SINGLE LAP SPOT WELDER

William J. Cartwright, Chicago, Ill., assignor to Continental Can Company, Inc., New York, N. Y., a corporation of New York Application May 21, 1954, Serial No. 431,357

25 Claims. (Cl. 219—6)

The invention relates generally to welding apparatus and primarily seeks to provide a novel form of welding apparatus adapted to form spot welds in lap portions of can bodies as they conveyed in processional order in a body maker.

It is common practice in can making to form can bodies by feeding blanks in processional order, working marginal edge portions of the blanks to adapt them for cooperation in the formation of lock and lap side seams, shaping the blanks about a horn and bringing the marginal edge portions into seam forming engagement and bumping the seams, and then continuing the feeding of the can bodies thus formed to and through a soldering station at which the seams are solder bonded. The present invention has for an object the provision of a novel welding apparatus for spot welding lap portions of can body side seams as they are fed step-by-step in spaced relation along a horn immediately after bumping of the side seams, and before solder bonding of the seams if said seams are to be solder bonded, said apparatus including an inner cylindrical electrode mounted within the horn so as to be disposed within a can body being welded, and an outer cylindrical electrode disposed without the horn and with its axis placed transversely with relation to the inner electrode axis, means for moving the outer electrode toward the inner electrode to grip between the electrodes a lap portion of a can body at rest opposite the electrodes, and away from the inner electrode to free the can body after spot welding thereof and permit feeding thereof along the horn, and means for passing current through the electrodes to effect the spot weld while the lap portion of the seam is gripped between the electrodes.

Another object of the invention is to provide in an apparatus of the character stated means for moving the electrodes circumferentially and axially in relation to each other after each weld so that successive welds will not be made through the same points on the electrodes.

Another object of the invention is to provide in an apparatus of the character stated novel mechanism for effecting compound movements of the cylindrical electrodes to provide on each a helical path of successive welding point areas for each complete welding cycle of electrode operation, means being included for varying the location of the helical path on each cylinder for each successive cycle so that the helical paths for different cycles will be in different locations.

Another object of the invention is to provide an apparatus of the character stated wherein are included means for relatively moving the electrodes after each welding operation to present an infinite number of new welding contact points or areas for a corresponding number of successive welds so that an infinite number of welds can be made before the electrodes have to be dressed.

Another object of the invention is to provide an apparatus of the character stated wherein are included means for imparting to each cylindrical electrode incremental or step-by-step movement about and along its axis, the movements about the axes being uni-directional, and the movements along the axes being reversed after having continued step-by-step in each direction for a distance approximating the length of each particular electrode.

Another object of the invention is to provide an apparatus of the character stated wherein the electrode moving means includes devices effective to impart an axial step movement to each electrode simultaneously with the imparting of each circumferential step movement thereof.

Another object of the invention is to provide an apparatus of the character stated wherein the devices for imparting the axial and circumferential movements to the electrodes are so correlated that the time interval necessary to complete an electrode revolution and the time interval necessary to complete an electrode reciprocation always will bear the same relation but never will coincide one with the other.

Another object of the invention is to provide an apparatus of the character stated wherein the inner electrode is mounted in the horn and rotatable with shaft means having rotative bearing in the horn and driven gear means fixed thereon, there being included driver gear means meshing with the first mentioned gear means and having rotative bearing in the horn, a plate cam oscillatable about the axis of the driver gear means and connected with the driver gear means through uni-directional ratchet means for imparting uni-directional movement to the meshing gear means and to the electrode as the plate cam is oscillated, means including an actuator carried by can body feeding means movable in the horn for oscillating the cam, and rotary cam means effective upon rotation of the driver gear means for moving the shaft means and electrode axially.

Another object of the invention is to provide an apparatus of the character stated wherein the devices for imparting movement to the inner electrode about and along its axis include a gear couple for bringing about the movement about the axis and a separate gear couple for bringing about the movement along the axis, said distinct gear couples having distinct gear ratios so as to assure that successive completions of full reciprocations of the inner electrode along its axis will never coincide with successive completions of full rotations of said electrode.

Another object of the invention is to provide an apparatus of the character stated wherein the inner electrode shaft means has rotative bearing in a split bearing, sections of which bearing are spring held against the shaft means so as to constantly and firmly grip the shaft means and compensate for wear, and wherein the welding current control means includes a contact maker reciprocable into and out of contact with the split bearing through spaces in the procession of fed can bodies.

Another object of the invention is to provide an apparatus of the character stated wherein the outer electrode is rotatable in bearings supported on a generally horizontally disposed pivoted arm, spring means being included constantly tending to lift the arm and press the outer electrode against the inner electrode or a lap seam portion on a can body surrounding the same, and cam actuated traction link means for pulling the arm downwardly to separate the electrodes and permit feeding of can bodies into and out of welding position between the electrodes.

Another object of the invention is to provide an apparatus of the character stated wherein the outer electrode is mounted on shaft means rotatable in bearings supported on the vertically swingable horizontal arm and having a driven gear fixed thereon, there also being included a rotatably mounted shaft paralleling the shaft means and having a worm gear thereon and a long driver pinion gear enmeshed with the driven gear, a fixed shaft paralleling the rotatable shaft and having a driver gear rotatable thereabout and enmeshed with the long driver pinion, a ratchet hub oscillatable about the fixed shaft, the driver gear having ratchet connection with the ratchet hub and with ratchet stop means on the fixed shaft so as to have unidirectional rotation imparted thereto as the ratchet hub is oscillated, means operable by swinging movement of the electrode supporting arm for oscillating the ratchet hub, and means operable by the worm gear to impart movement to the driven gear and the outer electrode along the axis of the electrode.

Another object of the invention is to provide an apparatus of the character stated wherein the means for oscillating the ratchet hub includes a generally horizontally disposed arm crank and link connected with the ratchet hub and pivotally supported to move up and down with the electrode supporting arm, an uprightly mounted and spring depressed plunger movable upwardly and downwardly with the electrode supporting arm and having its upper end underlying the pivotally supported arm and its lower end overlying a fixed support so that each time the parts move to lower the plunger against the fixed support, downward movement of the plunger and the pivotally supported arm will be arrested in a manner for causing continuing downward movement of the electrode and ratchet hub to bring about a rotational step movement of the ratchet hub and the gear coupled electrode.

A further object of the invention is to provide an apparatus of the character stated wherein the means for moving the outer electrode along its axis comprises a forked plate engaged in a groove in the gear fixed on the outer electrode shaft means, an upright swingably mounted arm connected with the forked plate for imparting movement thereto, an actuator shaft gear coupled with the worm gear to receive incremental rotary movement therefrom, and cam means on the actuator shaft and effective to impart movement to the upright arm.

A still further object of the invention is to provide an apparatus of the character stated wherein there are included an inner cylindrical electrode mounted within the horn along which the can bodies are fed in spaced relation, an outer cylindrical electrode disposed outside the horn and with its axis transversely with relation to the inner electrode, cam controlled means for moving the outer electrode toward the inner electrode to grip between the electrodes a lap portion of a can body at rest opposite the electrodes, and away from the inner electrode to free the can body after spot welding thereof and permit feeding thereof along the horn, and means for passing current through the electrodes to effect the spot weld while the lap portion of the seam is gripped between the electrodes and including a current source, a lead constantly connecting the current source with the outer electrode, a reciprocable contact maker connected with the power source and movable in and out through spaces between can bodies being fed to intermittently connect the current source with the inner electrode during rest intervals in the can body feeding, a timing switch cam controlled to close the welding circuit at each rest interval in the can body feeding, and a no-can-no-weld control switch connected in series with the timing switch and closed whenever a can body is presented opposite the electrodes, means being included for opening said control switch whenever no can is presented opposite the electrodes to prevent completion of the welding circuit.

With the above and other objects in view that will hereinafter appear, the nature of the invention will be more clearly understood by reference to the following detailed description, the appended claims and the several views illustrated in the accompanying drawings.

In the drawings:

Figure 1 is an enlarged fragmentary plan view illustrating a conventional can body side seam of the lock and lap type, the single lap portion at the trailing end of the can body being spot welded in accordance with the purpose of the invention.

Figure 2 is a somewhat diagrammatic plan view illustrating the cooperative relation of the upper or inner electrode and the underlying lower or outer electrode.

Figure 3 is a somewhat diagrammatic end elevation showing the electrode arrangement of Figure 2 and a side seam lap portion in position for being spot welded between the electrodes.

Figures 4 and 5 are diagrammatic views graphically illustrating the patterns of the paths made by the succession of welding spots on the inner and outer electrodes respectively, these patterns being brought about by moving each electrode a limited distance along and about its axis after each weld with the movements controlled so that the time interval necessary to complete an electrode revolution and the time interval necessary to complete an electrode reciprocation always will bear the same relation but never will coincide one with the other.

Figure 6 is an end elevation showing the electrodes and the supporting horn and frame structures, parts being broken away and in section.

Figure 7 is a side elevation showing the relation of the electrodes and portions of the supporting structures shown in Figure 6, the horn and a succession of can bodies being moved therealong being shown in dot and dash lines.

Figure 8 is a detail plan view illustrating the lower electrode supporting and reciprocating arm, the reciprocable contact block and its supporting and reciprocating arm and the bracket which pivotally supports the arms.

Figure 9 is a vertical cross section taken on the line 9—9 on Figure 8 and illustrating the reciprocable contact block and its supporting and reciprocating arm, and the cam for reciprocating the arm, the relation of the contact block and the split bearing for the inner electrode shaft being indicated in dot and dash lines.

Figure 10 is a fragmentary vertical cross section taken on the line 10—10 on Figure 9.

Figure 11 is a fragmentary longitudinal section illustrating the adjustable link by which the lower electrode supporting and reciprocating arm is connected with the cooperating actuator arm.

Figure 12 is a plan view illustrating the lower electrode supporting casting and the electrode rotating and reciprocating devices mounted thereon.

Figure 13 is a side elevation and part longitudinal section of the parts shown in Figure 12.

Figure 14 is a fragmentary longitudinal section illustrating the mounting of the ratchet pinion and the retrograde movement preventing ratchet associated therewith, these parts being associated with the lower electrode rotating and reciprocating devices.

Figure 15 is a vertical cross section taken on the line 15—15 on Figure 12.

Figure 16 is a vertical cross section taken on the line 16—16 on Figure 12.

Figure 17 is a plan view illustrating the upper or inner electrode supporting and moving devices removed from the supporting horn.

Figure 18 is a detail vertical cross section taken through the split bearing for the inner electrode, the section being taken on the line 18—18 on Figure 17.

Figure 19 is a vertical longitudinal section taken on the line 19—19 on Figure 17.

Figure 20 is a vertical cross section taken on the line 20—20 on Figure 19, the feed bar carried cam follower being shown in dot and dash lines in the position in which it engages the swingably mounted plate cam through which the rotational and longitudinal movements are imparted to the electrode.

Figure 21 is a vertical cross section taken on the line 21—21 on Figure 19.

Figure 22 is a view illustrating diagrammatically how the welding apparatus is connected with a current source, the manner of timing the weld, and the incorporation of a no-can-no-weld control.

In the example disclosure of the invention herein made the can bodies generally designated 5 are shown as being fed along the horn generally designated by 6 by conventional feeding means including the usual reciprocable feed bar indicated at 7 in Figures 6 and 7. The inner or upper electrode generally designated 8 is cylindrical in form and is mounted within the horn with its axis disposed longitudinally of and parallel to the axis of the horn. The outer or lower electrode generally designated 9 is without the horn and beneath the same, as indicated in Figures 6 and 7, and its axis is disposed transversely with relation to the axis of the inner electrode.

By reference to Figure 6 it will be noted that the horn includes an upper section 10 and a lower section 11, and between these sections there is provided a T-slot 12 opening downwardly through the bottom of the horn and providing a receiving chamber in which to mount the upper or inner electrode and its cooperating actuating devices.

A fragment of a can body 5 is illustrated in detail in Figure 1 and includes the usual side seam structure having the lock portion 13 and a lap portion 14. It is well understood in the art that a lap portion 14 is provided at each end of the lock and lap seam structure, but in this example disclosure it is proposed to provide a spot weld at one end only of the seam structure, as indicated at 15 in Figure 1. Thus, in this example disclosure, the can body feeding means is to be understood as effective to feed the can bodies step-by-step, or in processional order and in spaced relation, the trailing end of each can body being presented at the welding stage, or in proper welding position between the inner and outer electrodes, at the completion of each feed step movement of the feed bar 7.

The primary purpose of the present invention is to arrange the inner and outer electrodes 8 and 9 with their axes disposed in crossed or traversing relation, and to move the electrodes circumferentially and axially in relation to each other after each weld so that the successive welds will not be made through the same points on the electrodes. To enlarge upon this purpose, or to state the purpose in another way, the cooperating electrodes 8 and 9 are moved relatively after each weld in a manner for providing on each thereof a helical path of successive welding point areas for each complete welding cycle of electrode operation, means being included for varying the location of the helical path on each electrode and each successive cycle so that the helical paths for different cycles will lie in different positions. In this connection attention is directed to Figures 4 and 5 of the drawings wherein the helical path patterns and the varied successions thereof are graphically illustrated.

Figure 4 shows the pattern made by the successive weld spots on the inner electrode 8. The electrode cylinder is represented by the rectangular outline 8, and the longitudinal limits of the paths on the cylinder are represented by the two marginal lines 16 spaced inwardly from the ends of the cylinder. The graph indicates that the cylinder is rotated slightly more than one revolution for each reciprocation, but, of course, the same purpose of individually spacing the helices would be achieved should the cylinder be rotated slightly less than a complete revolution for each complete reciprocation thereof.

Assuming that the first spot weld is made at the point 1, during the first reciprocation stroke of a single cycle, the following succession of welds follows the path indicated by the line 17 extending from 1 to 1' which is halfway around the electrode. On the return stroke of the electrode the path of successive welds returns from 1' to 2 which completes a single cycle. The path for the second cycle is indicated by the line 18 which extends from 2 around to 2' and thence back to 3 from which the third cycle line 19 begins. This pattern is continued until the electrode has made a complete revolution, slightly more or slightly less according to the plan, and has established a circumferential series of welding paths.

The second circumferential series of welding paths does not begin at 1, however, but instead at $1^a$, the first path of the second series beginning at $1^a$, and the beginning of the second, third, fourth, etc., paths of the second cycle being designated $2^a$, $3^a$, and $4^a$, respectively. The second cycle similarly continues for a complete revolution of the electrode, whereupon the first path of the third series begins at $1^b$ and is followed by successive paths $2^b$, $3^b$, $4^b$, etc. It will be apparent that this can be developed indefinitely, and the only possibility of there being successive welds at a given point is where the lines cross, and it is more probable that the points of intersecting lines will fall between weld spots than exactly on weld spots.

Figure 5 shows a corresponding relationship of the first three paths 20, 21 and 22 of a circumferential series of paths for the outer or lower electrode 9. It will be evident that the pattern in this instance conforms to the one previously described in connection with Figure 4 with reference to the inner electrode 8 except that the outer electrode makes a complete rotation for each stroke of a reciprocation, instead of a half rotation as in the case of the inner electrode 8.

The upper or inner electrode 8, its mounting and actuating devices will first be described, and in this connection attention is directed to Figures 6, 7 and 17 through 21 of the drawings. This assembly includes a mounting plate 23 receivable in the T-slot 12 of the horn and to which is secured a horn bottom closure member or casting 24 providing an end bearing at 25, and an intermediate bearing at 26 for the shaft section comprising a part of the inner electrode carrying shaft means clearly illustrated in Figure 19.

The shaft section 27 has an end hub extension 28 equipped with an axially threaded bore 29 and an abutment head 30 spaced endwise from the hub end and equipped with a pin projection 31 paralleling the axis of the shaft section. A driven gear 32 is pin-secured on the shaft section 27, and at the end of the shaft section remote from the hub 28 the shaft section is reduced as at 33 to rotatably support a grooved cam 34 having a gear section 35 thereon. The cam and gear unit is held against endwise displacement by the retainer ring 36 which is secured to the end of the shaft section by screw means 37.

A follower pin 38 is fixed to a plate 39 which is in turn fixed to the horn 6, and the pin 38 projects into a peripheral groove 40 in the cam 34 so that incremental rotary movement imparted to the cam 34 through its gear section 35 will cause the shaft section 27 to partake of endwise movement or movement along its axis in one direction or the other simultaneously with each movement of the shaft section about its axis imparted through the gear section 32 in a manner to be described hereinafter. See Figures 17, 19 and 21.

The inner electrode carrying shaft means also includes a section 41 axially aligned with the section 27 and having an end recess 42 in which to receive the hub extension 28 of said shaft section 27. The shaft section 41 also includes an enlarged head 43 which is tapered at 44 to snugly engage in the flare within the surrounding electrode sleeve 45. The shaft section 41 also is axially bored to receive a screw 46 which may be threaded into the hub tap 29 to firmly draw the hub extension 28 into the recess 42 and to force the head taper 44 securely into the sleeve 45 and the sleeve firmly against the abutment head 30 with the driving pin projection 31 of the head engaged in the receiving recess 47 provided in the shaft section enlargement 43.

The shaft section 41 has rotative bearing in a split bearing best illustrated in Figures 17 to 19 and composed of an upper section 48 having mounting flanges 49 to be received in the T-slot 12 in the horn in the manner clearly illustrated in Figure 6, and a lower half section 50. The upper and lower half sections 48 and 50 of the split bearing are equipped with aligned bores 51 in which to receive retractile springs 52 secured at their upper and lower ends to pins 53 received in recesses 54 formed in the upper and lower faces of the half sections. The springs yieldably hold the bearing sections 48 and 50 against the shaft section 41 and serve to compensate for any wearing of the bearing surfaces.

It will be apparent by reference to Figures 17 and 19 that a gear sleeve 55 is rotatably mounted in a split bearing 56 provided therefor on the casting member 24. The sleeve 55 is equipped with an elongated driver gear section 57 at one end thereof and in position for meshing with the driven gear 32 secured on the electrode shaft section 27, and said sleeve also is equipped with an elongated driver gear section 58 at its other end and in position for meshing with the cam gear section 35 carried by the previously described grooved cam 34. A ratchet face 59 is provided on the sleeve 55 endwise of and adjacent the gear section 57, and a similar but reversely formed ratchet face 60 is disposed adjacent to and endwise of the other gear section 58. The sleeve 55 forms partial support for a fixed shaft 61, the same being keyed at 62 in an upward bearing extension provided on the casting 24. A cam plate 63 is secured at 64 to two collars 65 and 66 which are oscillatable about the fixed shaft 61. The collars 65 and 66 are spaced along the shaft 61 so as to bracket the gear sections 57 and 58 between them in the manner clearly illustrated in Figure 19.

A ratchet actuator collar 67 is oscillatably and slidably mounted on the shaft 61 between the collar 65 and the gear section 57, the same being engaged with the previously mentioned ratchet face 59 and being yieldably held thereagainst by a compression spring 68 interposed between the collar 65 and an abutment on the collar 67. The ratchet actuator collar 67 has a tongue and groove couple 69 with the collar 65 so that the collars 65 and 67 will be forced to oscillate in unison and yet permit the collar 67 to move endwise on the shaft 61 to clear the ratchet teeth when the gear section 57 is held against retrograde movement and thus make it possible for the cam plate 63 and the connected collars 65 and 67 to impart unidirectional step movements to the sleeve 55.

In order to prevent retrograde movement of the sleeve 55 a ratchet stop collar 70 is slidably mounted on the shaft 61 in position for engaging the previously described ratchet face 60. The collar 70 is yieldably held against the ratchet face 60 by a compression spring 71 interposed between the oscillatable collar 66 and an abutment enlargement on the collar 70. The collar 70 has a forked arm extension 72 disposed to engage a pin 73 projecting from a plate 74 which is vertically adjustably mounted at 75 on plate 23. It will be apparent by reference to Figures 17, 19 and 21 that the pin 73 will hold the collar 70 against rotational movement, but the same is free to move along the shaft 61 to clear the ratchet face 60 when the unidirectional incremental movements of rotation are imparted to the sleeve 55 by oscillation of the cam plate 63 and the connected collars 65 and 66. It will be apparent that the stop collar 70 will permit movement of rotation of the sleeve 65 in one direction, but will snap back into engagement with the ratchet face 60 after each such step movement of the sleeve 55 to prevent retrograde movement of said sleeve.

It will be apparent by reference to Figure 17 that the cam plate 63 has a laterally disposed edge portion or cam surface starting with a lead clearance 76 followed by dwell portion 77 paralleling the axis of the shaft 61 and then an active angularly disposed cam surface 78 which, when engaged by the actuator cam 79 depending from the feed bar 7, will impart oscillatory movement to the cam plate 63 and the connected collars 65 and 66. Each such lateral deflection of the cam plate 63 and the attendant movement of the collars 65 and 66 about the axis of the shaft 61 will be resisted by the anchored tension spring 80 which is connected at 81 to a crank extension 82 provided on the collar 65 in the manner best illustrated in Figures 17 and 20. After each oscillation of the cam plate 63 the collar 65 will be returned against the position determining stop 83. It is to be understood that the shaping of the cam surface 78 and the movement of the feed bar carried cam 79 are so correlated that at each oscillation of the cam plate 63 the step movement of rotation imparted to the gear section carrying sleeve 55 will always exceed the length of one ratchet tooth but will always be less than the length of two ratchet teeth.

The lower or outer electrode, its mounting and actuating devices will now be described, and in this connection attention is directed to Figures 12 through 16. The outer electrode generally designated 9 is mounted on a shaft 84 which is rotatably supported in an end bearing 85, as shown in Figure 6 an intermediate bearing 86 and a second end bearing 87, all said bearings being in insulating bushings. The bearing 85 is provided in the standard 88 extending upwardly from a horizontal base 89, preferably in the form of an aluminum casting. The bearing 86 is provided in an intermediate standard 90 secured at 91 on the base 89, and the third bearing 87 is provided in the end closure wall 92 of a housing 93 rising from the base at the end thereof remote from the standard 88. A backup block 94 engages under the electrode 9 and is secured at 95 on the base, an insulating block 96 being interposed between the base and the backup block.

Near the end of the shaft 84 remote from the electrode 9 a thrust bearing retainer 97 of insulating material is pinned on the shaft as at 98, within the housing 93. The retainer 97 opposes a terminal block 99 having an insulating sleeve 100 therein surrounding the shaft 84. The terminal block 99 extends upwardly through an opening or slideway 101 in the top of the housing 93, and in this slideway the block is surrounded about three sides by a U-shaped insulating block 102. An antifriction bearing is provided between the opposing faces of the retainer 97 and the terminal block 99 and includes a ring 103 recessed in the retainer 97, an opposing ring 104 and ball bearings disposed between said rings. The ring 104 is pin-mounted at 105 on the terminal block 99 and is spring pressed by compression springs 106 recessed in said block. A coin silver contact ring 107 surrounds the shaft 84 and the insulating sleeve 100 and is recessed in the terminal block 99 in the manner clearly illustrated in Figure 13. The contact ring 107 is preferably soldered to the terminal block 99. This ring is engaged by a clamp head 108 secured on a reduced end extension of the shaft 84. The compression springs 106 not only hold the assembly of the antifriction bearing parts, but also serve to hold the contact ring 107 and the clamp block 108 in efficient electrical contact. The terminal block 99 serves as a connecting point at 109 for one of the conductor terminals forming part of the means for electrically connecting the electrodes with a proper source of electrical energy.

The base 89 is laterally adjustably secured at 110 on transversely extending insulator blocks 111 and 112, and the captive screw means 113 may be employed for imparting movement of adjustment to the base 89 with relation to the horizontal arm 114 on which the base is supported. The arm 114 is pivotally supported at 115 for swinging movement up and down with relation to the inner electrode, as shown in Figures 6 and 7. This specific swingable mounting and the purpose thereof will be described in greater detail hereinafter.

A driven gear 116 is pinned on the electrode shaft 84 intermediately of the bearings 86 and 87, and this gear has an annular groove 117 in the hub portion thereof the purpose of which will become apparent hereinafter. The gear 116 meshes with a long driver pinion 118 having a worm gear end extension 119 and being keyed at 120 on a shaft 121 which is rotatably supported at its ends in bearings provided therefor in the housing end wall 92 and in the standard 90.

A stud shaft 122 is secured at 123 on the standard 90 in parallel relation to the shafts 84 and 121, and a driver gear 124 is rotatably supported on the shaft in position for meshing with the long pinion 118 in the manner clearly illustrated in Figures 12, 13 and 16 of the drawings. The gear 124 has a hub extension in each direction endwise thereof, and one such extension terminates in a ratchet face 125 and the other in a reversley directed ratchet face 126. The ratchet face 125 is engaged by a ratchet hub 127 supported for oscillation on the shaft 122 and which when oscillated will impart step movements to the gear 124 about the axis of the shaft 122. The ratchet face 126 is engaged with a ratchet lock hub 128 which is longitudinally slidable on the shaft 122 and has a halved together sliding abutment at 129 with an abutment head 130 secured at 131 on the shaft 122. See Figure 14. A compression spring 132 is interposed between the abutment head 130 and an annular enlargement on the hub 128 and serves to yieldably hold the ratchet face on the hub 128 against the ratchet face 126 of the driver gear 124.

The hub 127 has a crank extension 133 which is link connected at 134 to a horizontally disposed actuator arm 135 which is pivotally supported at 136 on the standard 90. See Figures 12, 13 and 15. The arm 135 carries a vertically adjustable abutment screw 137 which depends into a recess 138 in the standard. An upright plunger 139 is slide guided in the standard 90 in the manner illustrated in Figure 15 so that the upper end thereof projects into the recess 138 just beneath the lower end extremity of the abutment screw 137. The plunger 139 is normally held depressed by a compression spring 140 surrounding the plunger in the bore 141 in the standard 90 and engaging an abutment head 142, the head 142 thus being yieldably held against the base 89. A retractile spring 143 anchored at one end to the arm 135 and at its other end at 144 to the base 89 yieldably holds the arm 135 down against the standard 90 as shown in Figure 15. See also Figures 12 and 13.

The worm gear 119 meshes with and drives a worm gear 145 secured on a cross shaft 146 having rotative bearing at 147 on the base 89. The shaft carries a cam 148 at the end thereof remote from the gear 145, and the periphery of the cam engages a follower roller 149 mounted on an upright actuator arm 150 which is pivotally supported at its lower end at 151 on the base 89. The follower roller is held against the periphery of the cam by a retractile spring 152 which is connected at one end to the arm 150 and is anchored at its other end at 153 on the housing 93. Upper and lower parallel guide rods 154 are supported at their ends respectively on the housing end wall 92 and the standard 90, and a plate 155 is slide guided at 156 on these rods and has a forked portion 157 engaging in the groove 117 provided in the hub extension of the driven gear 116. The arm 150 is provided at its upper end with a fork 158, the same being pivotally supported on the arm as at 159 in position for straddling the edge of the plate 155 in the manner clearly illustrated in Figures 12, 15 and 16. It will be apparent that as swinging movement is imparted to the arm 150 by the cam 148 the fork connection 158 will impart sliding movement to the plate 155 along the rods 154, and the plate will impart longitudinal movement to the driven gear 116, the shaft 84 on which it is pinned and the electrode 9 carried by said shaft.

The previously described arm 114 which carries and oscillates the lower electrode is pivotally supported at 115 on a bracket 160 which is vertically adjustably mounted at 161 on a frame structure 162 disposed transversely under the horn 6 in the manner illustrated in Figures 6 and 7 of the drawings. The arm 114 has a depending abutment 163 which is opposed by a compression spring 164 projecting from a supporting socket in an adjustably mounted screw 165 threadably supported in the bracket 160. It will be apparent that the spring 164 constantly tends to swing the arm 114 upwardly and press the lower or outer electrode 9 against the upper or inner electrode 8, and by adjustment of the screw 165 the amount of pressure applied by the spring can be varied.

The upper end of the arm 114 is bifurcated at 166 to receive the upper ring end of a vertically adjustable tension link generally designated 167. The link 167 is composed of an upper section 168 and a lower section 169, the sections being adjustable as to length as at 170 and having a limited lost motion connection at 171. The link is connected at its lower end at 172 with a horizontal arm 173 which is pivoted at 174 on the frame structure. The arm 173 is equipped with a follower roller 175 engaged by an actuator cam 176 secured on the shaft 177 which is rotatably mounted at 178 on the frame structure. The shaft 177 is driven by suitable sprocket and chain connections 179 from any suitably timed source such as the side seamer drive shaft 180.

The pivotal support 174 for the arm 173 is provided on a bracket 181 which is vertically adjustably mounted at 182 on the frame, an eccentric 183 engaged in a horizontally disposed longitudinal slot in the bracket being adapted for imparting movements of adjustment to the bracket. Screw means 184 may also be employed to impart movements of adjustment to the other supporting bracket 160.

The shaft 177 also carries an actuator cam 185. See Figures 6 through 10. The cam 185 engages a follower roller 186 carried by a bracket 187 which is vertically adjustably mounted at 188 on an actuator arm 189 which is pivoted at 190 on the bracket 160. A retractile spring 191 anchored at one end to the bracket 187 and at its other end at 192 on the frame serves to hold the follower roller 186 against the cam 185.

A slideway 193 is provided in an upwardly directed portion of the arm 189, and a stop 194 overlies the upper end extremity of this slideway. A block 195 is vertically slidable in the slideway 193 and is yieldably held against the stop 194 by a compression spring 196 in the manner best illustrated in Figure 10. A contact maker 197 is secured on the slide block 195 and is adapted to be connected at 198 with a conductor forming a part of the means for directing electrical energy to the electrodes.

A stop plate 199 is engageable by the plunger 139 each time the link 167 lowers the arm 114 and the base 89 to separate the lower electrode 9 from the upper electrode 8, and the plate 199 is supported by the bracket 160 on an insulator block 200 carried by said bracket.

One means or manner of electrically connecting the electrodes with a current source and controlling the welding operation is diagrammatically illustrated in Figure 22 wherein the usual transformer is indicated at 201 as having its primary connected by conductors 202 and 203 with a power source, a no-can-no-weld control switch 204 and a timing switch 205 being connected in series in one of said conductors. The timing switch is shown as controlled by a rotary cam 206 which may be mounted on or driven from the previously mentioned power shaft 180. The switch 204 is of the normally closed type, and it will be apparent by reference to Figures 6 and 22 that the switch is under control of a lever 207 which is pivoted at 208 and is weighted or biased to constantly tend to project its finger portion 210 into a receiving recess 211 provided in the horn. Whenever a can body is fed into position at the welding station, as illustrated in Figure 6 it will displace the switch control finger 210 from the horn recess 211 and free the actuator 212 so that the switch button 213 can assume the normal, switch closed position illustrated in Figure 6. However, whenever no can body is presented at the welding station the lever 207 will be free to project its finger 210 into the horn recess so as to cause the actuator 212 to depress the switch button 213 and open the switch 204, thereby making it impossible to complete a welding circuit.

The secondary of the transformer is connected by a conductor 214 with the outer electrode 9 through the terminal connection 109 shown in Figures 6 and 13, and through the conductor means 215 with the inner electrode 8 through the terminal connection 198 and the contact maker 197 as shown in Figures 7 to 10, said conductor means 215 being grounded to the machine frame as indicated at 216.

In the operation of the machine the feed bar 7 is reciprocated longitudinally of the horn 6 in the well known manner and serves to advance the can bodies 5 along the horn in processional order and in spaced relation as indicated in dot and dash lines in Figure 7. Each time a can body comes to rest at the welding station, with its trailing lap seam portion 14 between the inner and outer electrodes 8 and 9 as indicated in Figure 7, the cam 176 will free the follower roller 175 in a manner for permitting the spring 164 to lift the arm 114 and the base 89 and press the outer electrode 9 against the lap seam portion 14 in the manner clearly illustrated in Figures 3 and 6. It will be remembered that as the lower electrode 9 is moved into position against the lap seam portion, the cam 185 will at the same time act through the follower 186 to lift the contact maker 197 through the space between can body ends and into contact with the split bearing block 50 in the manner illustrated in Figures 9 and 10. With the lap seam portions thus firmly pressed between the electrodes 8 and 9, and the contact maker 197 in contact with the upper electrode bearing block 50, the timing cam 206 will act to close the switch 205 and complete the welding circuit so that the desired spot weld indicated at 15 in Figure 1 can be made.

Upon completion of the spot weld the timing switch 205 will again open and the cam 176 will act on the follower roller 175 and through the link 167 to swing the arm 114 and the base 89 downwardly to separate the outer electrode 9 from the inner electrode and permit the feeding of the spot welded can body away from the welding station and the next succeeding can body into position at the welding station. The downward movement of the base 89 will cause the plunger 139 to engage and be arrested by the plate 199, thereby imparting upward swinging movement to the arm 135 and oscillation to the collar 127 which will be effective through the driver gear 124 to impart a step movement of rotation to the pinion 118, the gear 116 and the connected outer electrode 9, and also to the worm gear couple 119, 145 and the cam 148. The cam 148 will act through the follower roller 149 and the arm 150 and connections 153, 155 to impart a step movement endwise to the shaft 84 and the outer electrode 9 carried thereby. As previously described, only uni-directional, small increment rotation is imparted to the outer electrode 9, and the incremental endwise movement is imparted to said electrode simultaneously with the imparting of the rotational movement thereto. The cam moves the arm 150 and the electrode in one direction until the crest of the cam is reached and then the direction of endwise movement is reversed until the low point of the cam is reached, and as before described, the completion of each cycle of endwise movement of the electrode never coincides with the completion of a rotation of said electrode.

Each time the feed bar 7 moves to displace a welded can body from the welding station the depending cam 79 will impart oscillatory movement to the plate cam 63 in the manner previously described, and this oscillatory movement of the plate cam and its connected collars 65, 66 will impart a step rotation to the inner electrode 8 through the gear couple 57, 32, and an endwise step movement through the gear couple 58, 35 and the cam and pin connections 40, 38. While the teeth of the gears 32 and 35 correspond in number, there is provided a differential in the number of teeth on the gear sections 57 and 58 of the sleeve 55, preferably a differential of one tooth, so that there will be a slightly different gear ratio in the gear couple 57, 32 as compared to the gear couple 58, 35, thereby to make certain that the completion of the electrode rotation cycles and reciprocation cycles will always bear the same relation but never will exactly coincide as described in connection with the graphic illustrations in Figures 4 and 5.

While example illustrations of the cooperating parts of the apparatus are disclosed herein it is to be understood that variations in the structure and arrangement of the parts may be made without departing from the spirit and scope of the invention as defined in the appended claims.

I claim:

1. In apparatus for spot welding lap portions of can body side seams, a horn providing a welding station, means for feeding can bodies in processional order and in spaced relation along the horn, an inner generally cylindrical electrode disposed within the horn at the welding station with its axis extending along the horn, an outer generally cylindrical electrode disposed without the horn and with its axis placed transversely with relation to the inner electrode axis, means for moving the outer electrode toward the inner electrode to grip between the electrodes a side seam lap portion of a can body at rest at the welding station, and away from the inner electrode to free the can body after spot welding thereof and permit feeding thereof along the horn, and means for passing current through the electrodes to effect the spot weld while the lap portion is gripped between the electrodes.

2. Apparatus as defined in claim 1 wherein the means for passing current through the electrodes to effect the spot welds includes a current source, a lead constantly connecting the current source with the outer electrode, a reciprocable contact maker connected with the power source and movable in and out through spaces between can bodies being fed to intermittently connect the current source with the inner electrode during rest intervals in the can body feeding, a timing switch cam controlled to close the welding circuit at each rest interval in the can body feeding and while a side seam lap portion is gripped between the electrodes, and a no-can-no-weld control switch connected in series with the timing switch and closed whenever a can body is presented at the welding station but which is automatically opened whenever no can body is presented at the welding station so as to prevent completion of the welding circuit.

3. Apparatus as defined in claim 1 wherein there are included means for moving the electrodes circumferentially and axially in relation to each other after each weld so that successive welds will not be made through the same points on the electrodes.

4. Apparatus as defined in claim 1 wherein there are included means for moving the electrodes relatively after each weld to provide on each a helical path of successive welding point areas for each complete welding cycle of electrode operation, means also being included for varying the location of the helical path on each electrode for each successive cycle so that the helical paths for different cycles will lie in different positions.

5. Apparatus as defined in claim 1 wherein there are included means for relatively moving the electrodes after each welding operation to present an infinite number of new welding contact points for a corresponding number of successive welds so that an infinite number of welds can be made before the electrodes have to be dressed.

6. Apparatus as defined in claim 1 wherein are provided means for imparting to each electrode step-by-step movements about and along its axis, one such step movement following each spot welding operation, the movements about the axes being uni-directional, and the movements along the axes being reversed after having continued step-by-step in each direction for a distance approximating the length of each particular electrode.

7. Apparatus as defined in claim 1 wherein are provided means for imparting to each electrode step-by-step movements about and along its axis, one such step movement following each spot welding operation, the movements about the axes being uni-directional, and the movements along the axes being reversed after having continued step-by-step in each direction for a distance approximating the length of each particular electrode, the means for imparting the axial and circumferential movements to the electrodes being correlated so that an axial movement of each electrode will be imparted simultaneously with the imparting of each circumferential movement thereto, and so that the time interval necessary to complete an electrode revolution and the time interval necessary to complte an electrode reciprocation always will bear the same relation but never will coincide one with the other.

8. Apparatus as defined in claim 1 wherein there are included means for moving the electrodes circumferentially and axially in relation to each other after each weld so that successive welds will not be made through the same points on the electrodes, the means for so moving the inner electrode including shaft means with which the inner electrode is connected and having rotative bearing in the horn and driven gear means fixed thereon, driver gear means meshing with the driven gear means and having rotative bearing in the horn, a plate cam oscillatable about the axis of the driver gear means and connected with the driver gear means through uni-directional ratchet means for imparting uni-directional movement to the meshing driven gear means and the inner electrode as the plate cam is oscillated, means including an actuator carried by the can body feeding means and engageable with the plate cam for oscillating the same, and rotary cam means effective upon rotation of the driver gear means for moving the shaft means and the inner electrode axially.

9. Apparatus as defined in claim 1 wherein there are included means for moving the electrodes circumferentially and axially in relation to each other after each weld so that successive welds will not be made through the same points on the electrodes, the means for so moving the inner electrode including shaft means with which the inner electrode is connected and having rotative bearing in the horn and driven gear means fixed thereon, driver gear means meshing with the driven gear means and having rotative bearing in the horn, a plate cam oscillatable about the axis of the driver gear means and connected with the driver gear means through uni-directional ratchet means for imparting uni-directional movement to the meshing driven gear means and the inner electrode as the plate cam is oscillated, means including an actuator carried by the cam body feeding means and engageable with the plate cam for oscillating the same, a rotary grooved cam freely rotatable about the shaft means but held against relative movement therealong and being gear coupled with the driver gear means, and a follower pin engaged in the cam groove and fixed in the horn so as to cause the cam, the shaft means and the inner electrode to move axially as movements of rotation are imparted to the cam by the driver gear means.

10. Apparatus as defined in claim 1 wherein there are included means for moving the electrodes circumferentially and axially in relation to each other after each weld so that successive welds will not be made through the same points on the electrodes, the means for so moving the inner electrode including shaft means with which the inner electrode is connected and having rotative bearing in the horn and driven gear means fixed thereon, driver gear means meshing with the driven gear means and having rotative bearing in the horn, a plate cam oscillatable about the axis of the driver gear means and connected with the driver gear means through uni-directional ratchet means for imparting uni-directional movement to the meshing driven gear means and the inner electrode as the plate cam is oscillated, means including an actuator carried by the can body feeding means and engageable with the plate cam for oscillating the same, and rotary cam means gear coupled with the driver gear means and effective upon rotation of the driver gear means for moving the shaft means and the inner electrode axially, the gear couple between the shaft means and the driver gear means having a ratio differing from that of the gear couple between the driver gear means and the rotary cam so as to assure that successive completions of full reciprocations of the inner electrode along its axis will never coincide with successive completions of full rotations of the inner electrode.

11. Apparatus as defined in claim 1 wherein there are included means for moving the electrodes circumferentially and axially in relation to each other after each weld so that successive welds will not be made through the same points on the electrodes, the means for so moving the inner electrode including shaft means with which the inner electrode is connected and having rotative bearing in the horn and driven gear means fixed thereon, driver gear means meshing with the driven gear means and having rotative bearing in the horn, a plate cam oscillatable about the axis of the driver gear means and connected with the driver gear means through uni-directional ratchet means for imparting uni-directional movement to the meshing driven gear means and the inner electrode as the plate cam is oscillated, means including an actuator carried by the can body feeding means and engageable with the plate cam for oscillating the same, a rotary grooved cam freely rotatable about the shaft means but held against relative movement therealong and being gear coupled with the driver gear means, and a follower pin engaged in the cam groove and fixed in the horn so as to cause the cam, the shaft means and the inner electrode to move axially as movements of rotation are imparted to the cam by the driver gear means, the gear couple between the shaft means and the driver gear means having a ratio differing from that of the gear couple between the driver gear means and the rotary cam so as to assure that successive completions of full reciprocations of the inner electrode along its axis will never coincide with successive completions of full rotations of the inner electrode.

12. Apparatus as defined in claim 1 wherein the inner electrode is mounted on shaft means having rotative bearing in the horn at least in part in a split bearing sections of which are spring held against the shaft means so as to constantly and firmly grip the shaft means and compensate for wear, and wherein the welding current control means includes a contact maker reciprocable into and out of contact with the split bearing through spaces in the procession of fed can bodies.

13. Apparatus as defined in claim 1 wherein the inner electrode is in the form of a cylindrical sleeve having a flared interior surface and is mounted on shaft means having rotative bearing in the horn and including a main shaft section having a hub end portion equipped with an axial threaded bore and an abutment head spaced from its bored end extremity, and a coaxial section having an axial bore therethrough and a tapered enlargement dimensioned to fit snugly within the flare of the electrode sleeve and also a recess in which to receive said hub end portion, abutment screw means extending through the coaxial shaft section bore and threaded into the threaded bore in the hub end to force the electrode sleeve firmly against the abutment head and the tapered enlargement firmly into the electrode sleeve flare, said tapered enlargement and said abutment head having interengaging pin and recess means effective to cause the main shaft section and the coaxial shaft section to rotate together.

14. Apparatus as defined in claim 1 wherein the inner electrode is mounted on shaft means having rotative bearing in the horn at least in part in a split bearing sections of which are spring held against the shaft means so as to constantly and firmly grip the shaft means and compensate for wear, and wherein the welding current control means includes a contact maker reciprocable into and out of contact with the split bearing through spaces in the procession of fed can bodies, there also being included a generally horizontally disposed arm carrying said contact maker, a bracket pivotally supporting said arm, and means for adjusting the position of the bracket to vary the spaced relation of the arm carried contact maker with the axis of the horn, and rotary means for bringing about an oscillation of the contact maker carrying arm and move the contact maker into and out of contact with the split bearing.

15. Apparatus as defined in claim 1 wherein the inner electrode is mounted on shaft means having rotative bearing in the horn at least in part in a split bearing sections of which are spring held against the shaft means so as to constantly and firmly grip the shaft means and compensate for wear, and wherein the welding current control means includes a contact maker reciprocable into and out of contact with the split bearing through spaces in the procession of fed can bodies, there also being included a generally horizontally disposed arm carrying said contact maker, a bracket pivotally supporting said arm, and means for adjusting the position of the bracket to vary the spaced relation of the arm carried contact maker with the axis of the horn, a follower roller on said arm and means for adjusting its position on the arm to vary its spaced relation to the contact maker, and rotary cam means for bringing about an oscillation of the contact maker carrying arm and move the contact maker into and out of contact with the split bearing.

16. Apparatus as defined in claim 1 wherein there are included a generally horizontally disposed arm carrying the outer electrode, a bracket pivotally supporting said arm, and means for adjusting the position of the bracket to vary the spaced relation of the outer electrode with the axis of the horn, and rotary cam controlled means for bringing about an oscillation of the outer electrode supporting arm and movement of the outer electrode toward and from the inner electrode.

17. Apparatus as defined in claim 1 wherein the inner electrode is mounted on shaft means having rotative bearing in the horn at least in part in a split bearing sections of which are spring held against the shaft means so as to constantly and firmly grip the shaft means and compensate for wear, and wherein the welding current control means includes a contact maker reciprocable into and out of contact with the split bearing through spaces in the procession of fed can bodies, there also being included a generally horizontally disposed arm carrying the contact maker, and a second generally horizontally disposed arm supporting the outer electrode, a bracket pivotally supporting both said arms, and means for adjusting the position of the bracket to vary the spaced relation of the horn axis and the arm carried contact maker and outer electrode, and independent rotary cam means for bringing about oscillation of each said pivotally mounted arm to move the contact maker toward and from the split bearing and the outer electrode toward and from the inner electrode.

18. Apparatus as defined in claim 1 wherein the inner electrode is mounted on shaft means having rotative bearing in the horn at least in part in a split bearing sections of which are spring held against the shaft means so as to constantly and firmly grip the shaft means and compensate for wear, and wherein the welding current control means includes a contact maker reciprocable into and out of contact with the split bearing through spaces in the procession of fed can bodies, there also being included a generally horizontally disposed arm carrying said contact maker, rotary cam means for bringing about oscillation of the contact maker carrying arm to move the contact maker into and out of contact with the split bearing, said arm having a slideway therein in which the contact maker is mounted to provide a measure of lost motion of the contact maker along the line of oscillation of the arm, and spring means constantly urging the contact maker against the end of the slideway toward the split bearing whereby to permit an amount of over travel of the arm as the contact maker comes against the split bearing.

19. Apparatus as defined in claim 1 wherein the outer electrode is mounted on shaft means rotatable in bearings supported on a generally horizontally disposed arm, spring means being included constantly tending to lift the arm and press the outer electrode against the inner electrode or a lap seam portion on a can body surrounding the inner electrode, and cam actuated tension link means for pulling the arm downwardly to separate the electrodes and permit feeding of can bodies into and out of welding position between the electrodes.

20. Apparatus as defined in claim 1 wherein the outer electrode is mounted on shaft means rotatable in bearings supported on a generally horizontally disposed arm, spring means being included constantly tending to lift the arm and press the outer electrode against the inner electrode or lap seam portion on a can body surrounding the inner electrode, and cam actuated tension link means for pulling the arm downwardly to separate the electrodes and permit feeding of can bodies into and out of welding position between the electrodes, said tension link including upper and lower sections adjustable as to combined length and having lost motion connection between said sections.

21. Apparatus as defined in claim 1 wherein the outer electrode is mounted on shaft means rotatable in bearings supported on a vertically swingable horizontal arm and having a driven gear fixed thereon, there also being included a rotatably mounted shaft paralleling the shaft means and having a worm gear thereon and a long driver pinion gear enmeshed with the driven gear, a fixed shaft paralleling the rotatable shaft and having a driver gear rotatable thereabout and enmeshed with the long driver pinion, a ratchet hub oscillatable about the fixed shaft, the driver gear having ratchet connection with the ratchet hub and with ratchet stop means on the fixed shaft so as to have uni-directional rotation imparted thereto as the ratchet hub is oscillated, means operable by swinging movement of the electrode supporting arm for oscillating the ratchet hub, and means operable by the worm gear to impart movement to the driven gear and the outer electrode along the axis of the outer electrode.

22. Apparatus as defined in claim 1 wherein the outer electrode is mounted on shaft means rotatable in bearings supported on a vertically swingable horizontal arm and having a driven gear fixed thereon, there also being included a rotatably mounted shaft paralleling the shaft means and having a worm gear thereon and a long driver pinion gear enmeshed with the driven gear, a fixed shaft paralleling the rotatable shaft and having a driver gear rotatable thereabout and enmeshed with the long driver pinion, a ratchet hub oscillatable about the fixed shaft, the driver gear having ratchet connection with the ratchet hub and with ratchet stop means on the fixed shaft so as to have uni-directional rotation imparted thereto as the ratchet hub is oscillated, and means operable by the worm gear to impart movement to the driven gear and the outer electrode along the axis of the outer electrode, and means operable by swinging movement of the electrode supporting arm for oscillating the ratchet hub and including a generally horizontally disposed arm crank and link connection with the ratchet hub and pivotally supported to be movable up and down with the electrode supporting arm, and an uprightly mounted and spring depressed plunger movable upwardly and downwardly with the outer electrode supporting arm and having its upper end underlying the pivotally supported arm and its lower end overlying a fixed support so that each time the plunger is lowered against the fixed support downward movement of the plunger and the pivotally supported arm will be arrested in a manner for causing continuing downward movement of the outer electrode and ratchet hub to bring about a rotational step movement of the ratchet hub and the gear coupled outer electrode.

23. Apparatus as defined in claim 1 wherein the outer electrode is mounted on shaft means rotatable in bearings supported on a vertically swingable horizontal arm and having a driven gear fixed thereon, there also being included a rotatably mounted shaft paralleling the shaft means and having a worm gear thereon and a long driver pinion gear enmeshed with the driven gear, a fixed shaft paralleling the rotatable shaft and having a driver gear rotatable thereabout and enmeshed with the long driver pinion, a ratchet hub oscillatable about the fixed shaft, the driver gear having ratchet connection with the ratchet hub and with ratchet stop means on the fixed shaft so as to have uni-directional rotation imparted thereto as the ratchet hub is oscillated, means operable by swinging movement of the electrode supporting arm for oscillating the ratchet hub, and means operable by the worm gear to impart movement to the driven gear and the outer electrode along the axis of the outer elecrode, said last named means comprising a forked plate engaged in a groove in the gear fixed on the outer electrode shaft means, an upright swingably mounted arm connected with the forked plate for imparting movement thereto, an actuator shaft gear coupled with the worm gear to receive incremental rotary movement therefrom, and cam means on the actuator shaft and effective to impart movement to the upright arm.

24. Apparatus as defined in claim 1 wherein the outer electrode is mounted on shaft means rotatable in bearings supported on a vertically swingable horizontal arm and having a driven gear fixed thereon, there also being included a rotatably mounted shaft paralleling the shaft means and having a worm gear thereon and a long driver pinion gear enmeshed with the driven gear, a fixed shaft paralleling the rotatable shaft and having a driver gear rotatable thereabout and enmeshed with the long driver pinion, a ratchet hub oscillatable about the fixed shaft, the driver gear having ratchet connection with the ratchet hub and with ratchet stop means on the fixed shaft so as to have uni-directional rotation imparted thereto as the ratchet hub is oscillated, and means operable by the worm gear to impart movement to the driven gear and the outer electrode along the axis of the outer electrode, and means operable by swinging movement of the electrode supporting arm for oscillating the ratchet hub and including a generally horizontally disposed arm crank and link connected with the ratchet hub and pivotally supported to be movable up and down with the electrode supporting arm, an uprightly mounted and spring depressed plunger movable upwardly and downwardly with the outer electrode supporting arm and having its upper end underlying the pivotally supported arm and its lower end overlying a fixed support so that each time the plunger is lowered against the fixed support downward movement of the plunger and the pivotally supported arm will be arrested in a manner for causing continuing downward movement of the outer electrode and ratchet hub to bring about a rotational step movement of the ratchet hub and the gear coupled outer electrode and means for adjusting the point of effective contact of the upright plunger with the overlying horizontally disposed arm so that the degree of movement to be imparted to the ratchet hub can be varied.

25. Apparatus as defined in claim 1 wherein the outer electrode is mounted on shaft means rotatable in bearings supported on a generally horizontal arm having a housing thereon into which an end of the shaft means remote from the outer electrode extends, said housing including an elongated slideway, and wherein the means for passing current through the electrodes includes a terminal block slidable in and projecting from the housing slideway and in which the shaft means has insulated rotative bearing, an insulator block secured to the shaft means endwise of the terminal block in one direction, an antifriction bearing interposed between the insulator block and the terminal block, a clamp block gripping the shaft means at an electrical conductor and electrically connecting with the terminal block through a contact ring surrounding the insulated bearing, and means insulating the terminal block from the housing in the slideway.

References Cited in the file of this patent

UNITED STATES PATENTS

| | | |
|---|---|---|
| 1,773,892 | Toleich | Aug. 26, 1930 |
| 2,282,339 | Murch | May 12, 1942 |